United States Patent [19]
Nolle

[11] Patent Number: 5,138,123
[45] Date of Patent: Aug. 11, 1992

[54] INDUCTIVELY OPERATED HEATING APPARATUS FOR PLASTIC MATERIALS

[75] Inventor: Eugen Nolle, Sersheim, Fed. Rep. of Germany

[73] Assignee: BLUM GmbH, Fed. Rep. of Germany

[21] Appl. No.: 606,450

[22] Filed: Oct. 31, 1990

[30] Foreign Application Priority Data

Nov. 2, 1989 [DE] Fed. Rep. of Germany ....... 3936323

[51] Int. Cl.⁵ .................................................. H05B 6/44
[52] U.S. Cl. ............................ 219/10.491; 219/10.75; 219/10.79
[58] Field of Search ............ 219/10.491, 10.75, 10.53, 219/10.67, 10.71, 10.79, 10.57

[56] References Cited

U.S. PATENT DOCUMENTS

| | | | |
|---|---|---|---|
| 3,663,782 | 5/1972 | Emerson | 219/10.79 |
| 3,739,131 | 6/1973 | Reinke | 219/10.79 |
| 3,965,321 | 6/1976 | Brinkmann et al. | 219/10.41 |
| 4,145,591 | 3/1979 | Takeda | 219/10.491 |
| 4,281,234 | 7/1981 | Dohogne | 219/10.57 |
| 4,300,031 | 11/1981 | Reboux et al. | 219/10.75 |
| 5,003,145 | 3/1991 | Nolle et al. | 219/10.491 |

*Primary Examiner*—Philip J. Leung
*Attorney, Agent, or Firm*—Peter K. Kontler

[57] ABSTRACT

An inductively operated heating apparatus for plastic materials in extruders or like machines has a steel housing with one or more passages for the material to b heated and two groups of laminated E-shaped iron cores which are magnetically coupled to the housing to establish a magnetic field. The legs of the cores extend toward the housing and the apparatus further comprises insulators which are interposed between the housing and several legs of each core. Each group of cores is assembled with a substantially V-shaped clamping device into a module, and the two modules are held together by coupling means which cause the resilient clamping devices to store energy and to bias the legs of the cores in the respective groups against the adjacent insulators which bear against the housing. The two clamping devices and the two groups of cores are mirror images of each other.

10 Claims, 2 Drawing Sheets

INDUCTIVELY OPERATED HEATING APPARATUS FOR PLASTIC MATERIALS

BACKGROUND OF THE INVENTION

The present invention relates to improvements in apparatus for heating plastic or like materials, and more particularly to improvements in apparatus of the type disclosed in commonly owned copending patent application Ser. No. 451,337 of Nolle et al. for "Inductively operated heating apparatus for plastic materials", now U.S. Pat. No. 5,003,145 granted Mar. 26, 1991. The disclosure of the copending application Ser. No. 451,337 is incorporated herein by reference.

It is known to provide an inductively operated heating apparatus for plastic materials with a housing which is made of steel and has one or more passages for the material to be heated. The magnetic field of the apparatus is established by laminated iron cores which are magnetically coupled with the housing and have legs extending toward the housing. At least one leg of each core carries a winding. Apparatus of the just outlined type and disclosed, for example, in the aforementioned copending patent application Ser. No. 451,337, can be used with advantage in extruding machines for plastic materials.

OBJECTS OF THE INVENTION

An object of the invention is to provide a novel and improved inductively heated apparatus which can be assembled and taken apart in a simple and time-saving manner.

Another object of the invention is to provide an apparatus which comprises a large number of similar or identical parts.

A further object of the invention is to provide the apparatus with novel and improved means for maintaining the cores in optimum positions with reference to the housing.

An additional object of the invention is to provide a novel and improved method of assembling an inductively operated heating apparatus for use in extruders and analogous machines.

Still another object of the invention is to provide an apparatus which is simpler, less expensive and more efficient than heretofore known apparatus.

A further object of the invention is to provide a novel and improved housing for use in the above outlined apparatus.

An additional object of the invention is to provide novel and improved insulators for use in the above outlined apparatus.

SUMMARY OF THE INVENTION

The invention resides in the provision of an inductively operated heating apparatus for plastic materials or the like. The improved apparatus comprises a heat-transmitting housing (preferably a steel housing) having at least one passage for the material to be heated, and means for heating the housing including a plurality of laminated cores which are magnetically coupled to the housing to establish a magnetic field. Each core is or can be E-shaped and includes a plurality of legs and at least one winding or exciting coil on at least one of the legs. The cores include a first group and a second group, and the apparatus further comprises a clamping device for the cores of each group. The cores of the two groups and the clamping devices are mirror images of each other. The number of cores in one of the groups can match the number of cores in the other group. The legs of the cores extend toward the housing.

The housing can but need not have a circular cross-sectional outline, and the cores in each group can be mirror images of each other. Furthermore, each clamping device can comprise two mirror symmetrical halves.

An insulator can be interposed between the housing and at least one of the cores. Each insulator can overlie more than one leg of the respective core.

If the housing has a substantially circular cross-sectional outline, the apparatus can further comprise two substantially semicylindrical shell-like insulators each of which is interposed between the housing and a different group of cores.

The clamping devices can be made of a resilient material, and the housing can further comprise means for coupling the two clamping devices to each other so that each clamping device stores energy as a result of deformation by the coupling means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
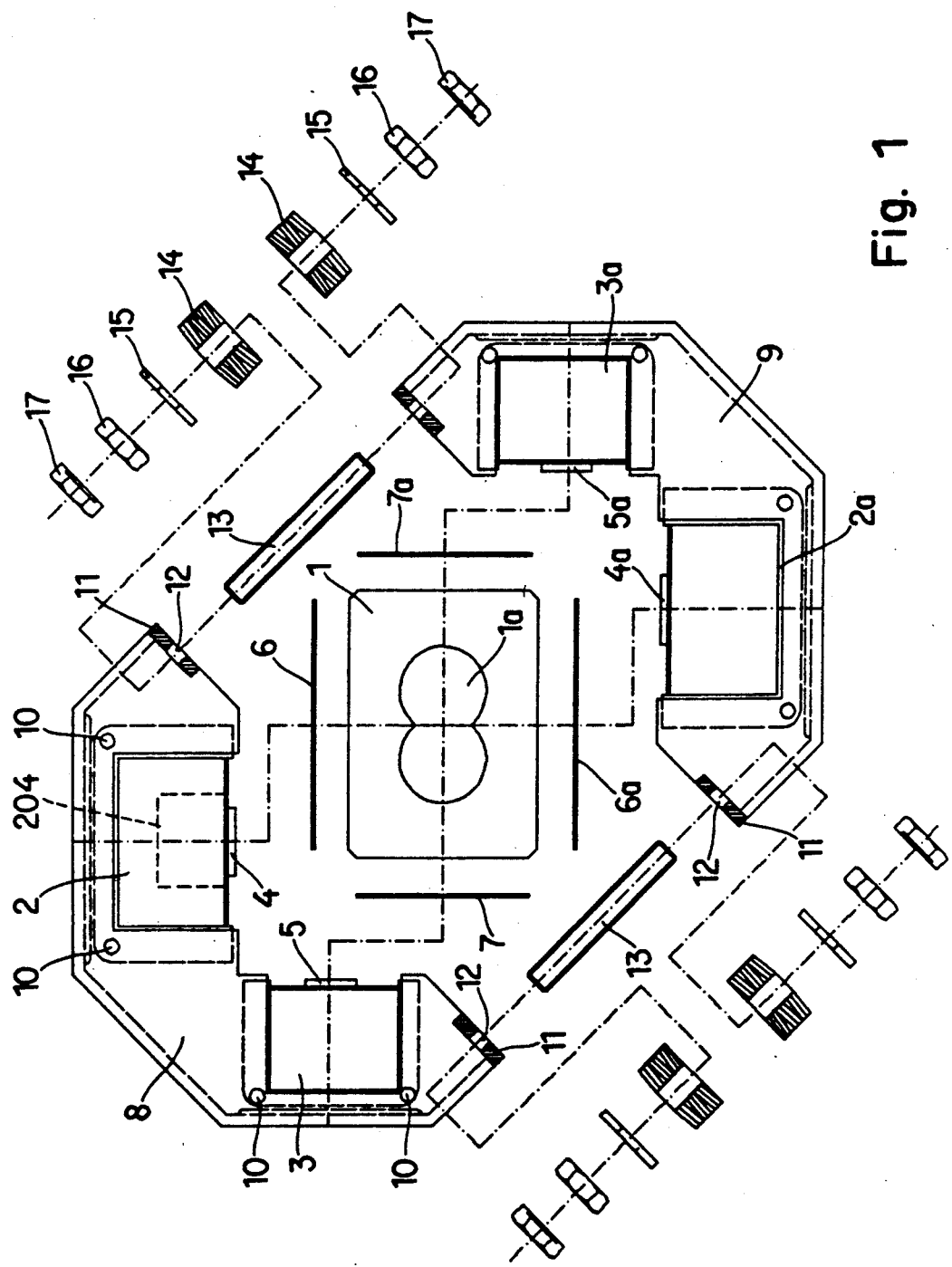
FIG. 1 is an exploded view of an apparatus which embodies one form of the invention and has a polygonal housing.

The apparatus which is shown in FIG. 1 comprises a housing 1 which has a rectangular cross-sectional outline and is provided with at least one passage 1a (one shown) for the material to be heated (e.g., a plastic material which is to be heated in an extruder). The material can be conveyed through the passage by one or more rotary screws or the like, not shown. The means for heating the housing 1 comprises at least four laminated iron cores 2, 3, 2a, 3a which are disposed in two groups one of which includes the cores 2, 3 and the other of which includes the cores 2a, 3a. The cores are magnetically coupled to the housing 1 to establish a magnetic field. Each core has three legs (i.e., each core resembles the letter E) which extend toward the housing 1, and the centrally located legs 4, 5, 4a, 5a of the respective cores 2, 3, 2a, 3a are surrounded by windings or coils (one indicated by broken lines, as at 204).

The apparatus further comprises four sheet-like insulators 6, 7, 6a, 7a which are interposed between the housing 1 and the legs of the cores 2, 3, 2a, 3a, respectively. It will be noted that each insulator overlies more than one leg of the respective core.

The apparatus also comprises two substantially V-shaped resilient clamping devices 8 and 9 the first of which contains and confines the cores 2, 3 and the second of which contains and confines the cores 2a, 3a. The two halves of each of the two clamping device 8, 9 are mirror images of each other, the two groups of cores 2, 3 and 2a, 3a are mirror images of each other, and the cores 2 and 3 as well as 2a and 3a of each group are mirror images of each other, i.e., they are centrically or point symmetrical to each other. The clamping device 8 surrounds the webs and the outer sides of outer legs of the cores 2, 3 and the clamping device 9 surrounds the webs and the outer legs of the cores 2a, 3a. Each of these clamping devices is made of a single piece of suitable material. Each clamping device can be said to resemble a casing for the cores and the windings for coils of the respective group. The cores 2, 3 and the coupling device 8 are assembled into a first module, and the coupling device 9 and the cores 2a, 3a are assembled into a second module which is point symmetrical to the first module. The two modules are then secured to each other by two coupling means each including two externally threaded rods or studs 13, two packages of diaphragm springs 14, two washers 15, two nuts 16 and (if necessary) two lock nuts 17.

The cores 2, 3 can be slid into ways which are provided in the clamping device 8, and the thus inserted cores are thereupon secured to the device 8 by suitable fastener means 10, e.g., fastener means in the form of screws, bolts, rivets or the like. The arrangement is preferably such that the clamping device 8 extends at least in part beyond the respective cores 2, 3 in the axial and radial directions of the housing 1. The mode of assembling the clamping device 9 with the cores 2a, 3a is the same as described above in connection with the clamping device 8 and cores 2, 3. When the two coupling means are applied so that the legs of the cores 2, 3, 2a, 3a abut and bear against the respective insulators 6, 7, 6a, 7a and the insulators bear against the adjacent sides of the housing 1, the clamping devices 8, 9 preferably define two clearances which extend in the axial direction of the housing, one of which is disposed between the cores 2, 3a and the other of which is disposed between the cores 2a, 3.

Each of the two clamping device 8, 9 is provided with two flanges 11 with holes or bores 12 for the respective externally threaded studs 13 of the coupling means. The end portions of each stud 13 project beyond the respective holes 12 to extend through the packages of springs 14, through the washers 15 and to receive the nuts 16 followed, if necessary, by lock nuts 17. The nuts 16 can be applied with a force which is necessary to cause each of the clamping devices 8, 9 to store a certain amount of energy.

Each of the two coupling means which are shown in FIG. 1 can be replaced by simpler coupling means including a bolt having a head outwardly adjacent one of the holes 12 and an externally threaded shank which extends through the respective holes and the free end portion of which carries a package 14 of springs, a washer 15, a nut 16 and, if necessary, a lock nut 17. The bias of the package or packages of springs 14 suffices to ensure that the clamping devices 8, 9 (which are preferably resilient) store at least some energy when the apparatus is fully assembled.

Figure 2:
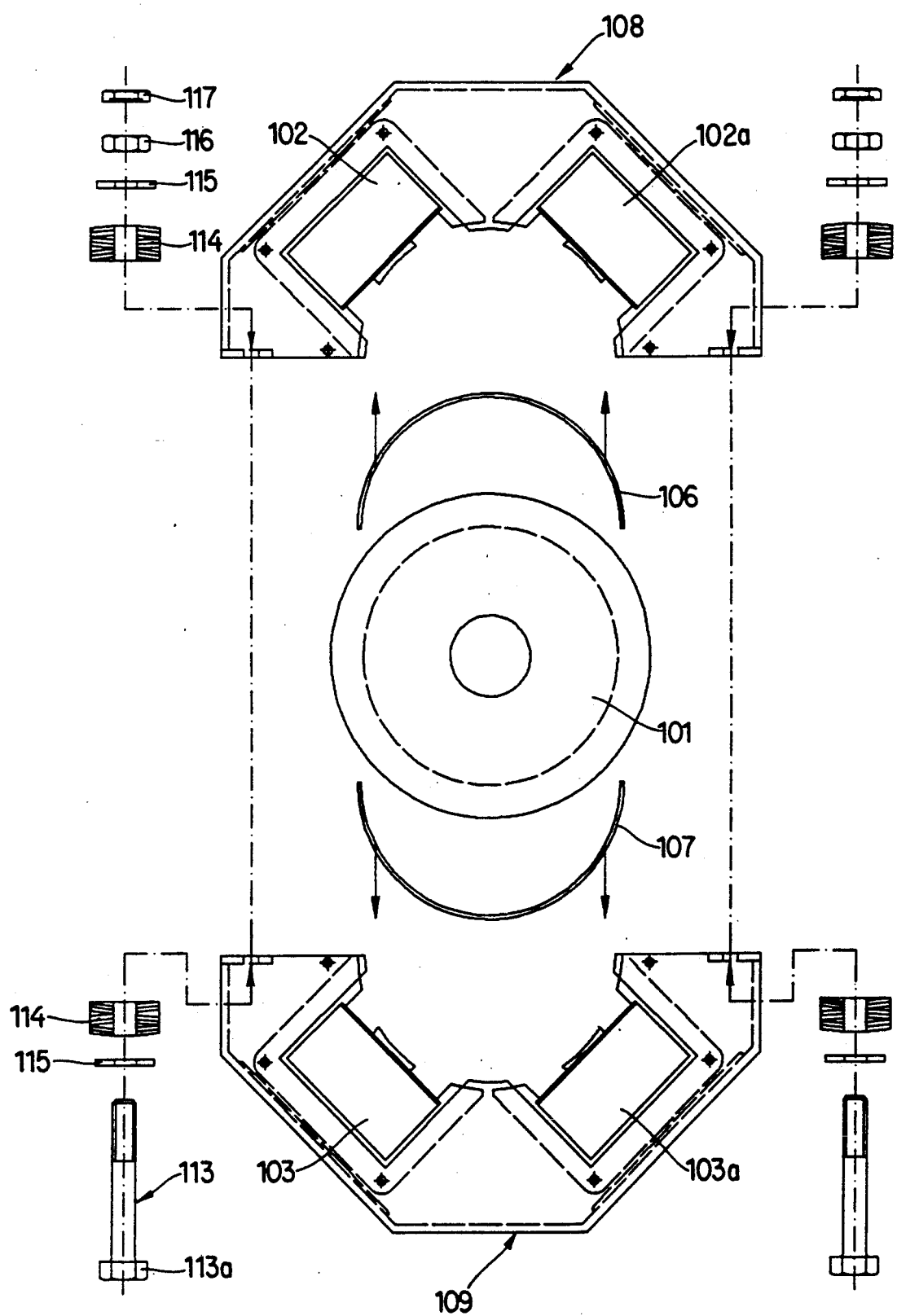
FIG. 2 is an exploded view of a second apparatus which comprises a cylindrical housing.

FIG. 2 shows a modified apparatus with a cylindrical housing 101 which has a circular cross-sectional outline, with two semicylindrical shell-shaped insulators 106, 107, two groups of E-shaped iron cores 102, 102a and 103, 103a, and two substantially V-shaped clamping devices 108, 109 for the respective groups of cores. The apparatus of FIG. 2 employs simplified coupling means each of which includes a bolt 113 having a head 113a, two washers 115, two packages of diaphragm springs or dished springs 114, a single nut 116 and a single lock nut 117. The manner of assembling the clamping devices 108, 109 and the respective groups of cores 102, 102a and 103, 103a into modules is the same as described with reference to FIG. 1.

The insulators 6, 7, 6a, 7a and 106, 107 are made of a suitable heat-resistant material. The radii of curvature of concave internal surfaces of the insulators 106, 107 can match or approximate the radius of curvature of the adjacent portion of the housing 101. The clamping devices 108, 109 are mirror images of each other, the two groups of cores 102, 102a and 103, 103a are mirror images of each other, and the cores (102, 102a and 103, 103a of each group of cores are mirror images of each other).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An inductively operated heating apparatus for plastic materials and the like, comprising a heat-transmitting housing having at least one passage for the material to be heated; means for heating said housing including a plurality of laminated cores magnetically coupled to said housing to establish a magnetic field, each of said cores having a plurality of legs and at least one winding on at least one of said legs, said cores including a first group and a second group; and a casing-shaped clamping device for the cores of each of said groups, the cores of said groups and said clamping devices being mirror images of each other and the cores of each group being at least partially surrounded by the respective clamping devices, the cores of each group being maintained in predetermined positions relative to each other and being biased against said housing by the respective clamping device.

2. The apparatus of claim 1, wherein said housing consists of steel and the number of cores in one of said groups matches the number of cores in the other of said groups.

3. The apparatus of claim 1, wherein said cores are E-shaped iron cores.

4. The apparatus of claim 1, wherein the legs of said cores extend toward said housing.

5. The apparatus of claim 1, wherein said housing has a circular cross-sectional outline, the cores of each of said groups being mirror images of each other.

6. The apparatus of claim 1, wherein said housing has a circular cross-sectional outline, each of said clamping devices having two mirror symmetrical halves.

7. The apparatus of claim 1, further comprising an insulator interposed between said housing and at least one of said cores.

8. The apparatus of claim 7, wherein said insulator overlies several legs of said at least one core.

9. The apparatus of claim 1, wherein said housing has a circular cross-sectional outline and further comprising two substantially semicylindrical insulators each interposed between said housing and a different one of said groups.

10. The apparatus of claim 1, wherein said clamping devices are resilient and further comprising means for coupling said devices to each other so that each of said devices stores energy.

* * * * *